United States Patent
Yu et al.

(10) Patent No.: US 12,423,835 B2
(45) Date of Patent: Sep. 23, 2025

(54) METHOD AND APPARATUS WITH TARGET TRACKING

(71) Applicant: Samsung Electronics Co., Ltd., Suwon-si (KR)

(72) Inventors: Jiaqian Yu, Beijing (CN); Siyang Pan, Beijing (CN); Changbeom Park, Suwon-si (KR); Hyunjeong Lee, Suwon-si (KR); Byung In Yoo, Suwon-si (KR); Qiang Wang, Beijing (CN); Yiwei Chen, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 382 days.

(21) Appl. No.: 18/084,003

(22) Filed: Dec. 19, 2022

(65) Prior Publication Data

US 2023/0196589 A1 Jun. 22, 2023

(30) Foreign Application Priority Data

Dec. 17, 2021 (CN) .......................... 202111555172.1
Nov. 22, 2022 (KR) ......................... 10-2022-0157467

(51) Int. Cl.
*G06T 7/20* (2017.01)
*G06T 7/246* (2017.01)

(52) U.S. Cl.
CPC .... *G06T 7/248* (2017.01); *G06T 2207/20016* (2013.01)

(58) Field of Classification Search
CPC ........... G06T 7/248; G06T 2207/10016; G06T 2207/20081; G06T 2207/20084
See application file for complete search history.

(56) References Cited

U.S. PATENT DOCUMENTS

| | | |
|---|---|---|
| 10,755,114 B1 | 8/2020 | Wang et al. |
| 10,755,129 B2 | 8/2020 | Chen et al. |
| 11,087,130 B2 | 8/2021 | Liu et al. |
| 2011/0142282 A1* | 6/2011 | Srikrishnan ............. G06T 7/277 382/103 |
| 2015/0279021 A1* | 10/2015 | Wu ......................... G06T 7/277 382/103 |
| 2018/0260614 A1* | 9/2018 | Wang ...................... G06T 7/223 |
| 2019/0391578 A1 | 12/2019 | Tariq et al. |
| 2022/0366576 A1* | 11/2022 | Wang ...................... G06T 7/248 |

OTHER PUBLICATIONS

Danelljen et al., "Accurate Scale Estimation for Robust Visual Tracking," 2014, British Machine Vision Conference, Sections 3.1 and 3.2. (Year: 2014).*

Yang et al, "Multi-Object Tracking with Tracked Object Bounding Box Association," May 17, 2021, IEEE International Conference, Section I. (Year: 2021).*

* cited by examiner

*Primary Examiner* — Sam Bhattacharya
(74) *Attorney, Agent, or Firm* — NSIP Law (57) ABSTRACT

A processor-implemented method with target tracking includes: generating a first target tracking result based on a search region of a current frame image; determining a scale feature of the first target tracking result; predicting a scale of a target in the search region based on the scale feature of the first target tracking result; and generating a second target tracking result by adjusting the first target tracking result based on a scale predicting result.

19 Claims, 9 Drawing Sheets

METHOD AND APPARATUS WITH TARGET TRACKING

CROSS-REFERENCE TO RELATED APPLICATIONS

This application claims the benefit under 35 USC § 119(a) of Chinese Patent Application No. 202111555172.1, filed on Dec. 17, 2021 in the China National Intellectual Property Administration, and Korean Patent Application No. 10-2022-0157467, filed on Nov. 22, 2022 in the Korean Intellectual Property Office, the entire disclosures of which are incorporated herein by reference for all purposes.

BACKGROUND

1. Field

The following description relates to a method and apparatus with target tracking.

2. Description of Related Art

Visual object tracking is a field in computer vision. A specific job thereof may be to continuously predict a bounding box of a target object in a subsequent frame image based on a first frame image and a provided bounding box of the target object. A core idea may be to extract template information based on a target displayed in a first frame, calculate a degree of matching between candidate positions, which are different from each other, and a template, in a search region of a subsequent video frame, and determine a target position by selecting a position with the highest degree of matching.

The object tracking technology may be generally used to move common objects such as people, animals, aircraft, cars, and the like. However, unlike object detection, the object tracking may not detect categorical attributes of the objects. The object tracking may be divided into short-term visual object tracking and long-term visual object tracking according to a scene being tracked. In the long-term visual object tracking, verification of a predicted object tracking state and re-detection after object tracking failure may be added based on the short-term visual object tracking technology.

In the object tracking, the consumption of computing resources may be relatively large, which affects real-time tracking, and the number of cumulative errors of a scale occurring in the object tracking may be relatively large, which affects the effect of the object tracking.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method with target tracking includes: generating a first target tracking result based on a search region of a current frame image; determining a scale feature of the first target tracking result; predicting a scale of a target in the search region based on the scale feature of the first target tracking result; and generating a second target tracking result by adjusting the first target tracking result based on a scale predicting result.

The search region may be either one of an entire region of the current frame image and a region larger than a target tracking result of a previous frame image.

The search region may be determined based on a target tracking result of a previous frame image.

The first target tracking result may include a first tracking bounding box, and the second target tracking result may include a second tracking bounding box.

The method may include determining whether target tracking has succeeded based on the scale feature of the first target tracking result.

The determining of whether the target tracking has succeeded based on the scale feature of the first target tracking result may include: determining an appearance feature of the first target tracking result; and determining whether the target tracking has succeeded based on the appearance feature of the first target tracking result and the scale feature of the first target tracking result.

The method may include adjusting the first target tracking result based on the appearance feature of the first target tracking result.

The determining of the scale feature of the first target tracking result may include: determining a multi-scale template region of interest (ROI) feature; determining an ROI feature of the first target tracking result; and determining the scale feature of the first target tracking result based on the multi-scale template ROI feature and the ROI feature of the first target tracking result, and the ROI feature of the first target tracking result may include ROI features of respective scales.

The determining of the scale feature of the first target tracking result based on the multi-scale template ROI feature and the ROI feature of the first target tracking result may include: performing feature alignment of each of the ROI features of the respective scales comprised in the ROI feature of the first target tracking result, based on an appearance feature of the first target tracking result; and determining the scale feature of the first target tracking result based on the feature-aligned ROI features of the respective scales.

The determining of the scale feature of the first target tracking result based on the multi-scale template ROI feature and the ROI feature of the first target tracking result may include determining the scale feature of the first target tracking result by calculating a correlation between the multi-scale template ROI feature and the ROI feature of the first target tracking result.

The determining of the scale feature of the first target tracking result by calculating the correlation between the multi-scale template ROI feature and the ROI feature of the first target tracking result may include calculating each correlation between the ROI feature of each scale from the ROI feature of the first target tracking result and a scale of the multi-scale template ROI feature.

The ROI feature of the first target tracking result may include a single-scale ROI feature, and the scale feature of the first target tracking result may include a one-dimensional scale feature.

The ROI feature of the first target tracking result may include a multi-scale ROI feature, and the scale feature of the first target tracking result may include a two-dimensional scale feature.

In another general aspect, one or more embodiments include a non-transitory computer-readable storage medium storing instructions that, when executed by one or more processors, configure the one or more processors to perform any one, any combination, or all operations and methods described herein.

In another general aspect, an apparatus with target tracking may include: a processor configured to: determine a first target tracking result based on a search region of a current frame image; obtain a scale feature of the first target tracking result; predict a scale of a target in the search region based on the scale feature of the first target tracking result; and obtain a second target tracking result by adjusting the first target tracking result based on a scale predicting result.

The search region may be either one of an entire region of the current frame image and a region larger than a target tracking result of a previous frame image.

The search region may be determined based on a target tracking result of a previous frame image.

The processor may be further configured to determine whether target tracking has succeeded based on the scale feature of the first target tracking result.

For the determining of whether the target tracking has succeeded based on the scale feature of the first target tracking result, the processor may be configured to: determine an appearance feature of the first target tracking result; and determine whether the target tracking has succeeded based on the appearance feature of the first target tracking result and the scale feature of the first target tracking result.

For the determining of the scale feature of the first target tracking result, the processor may be configured to: determine a multi-scale template region of interest (ROI) feature; determine an ROI feature of the first target tracking result; and determine the scale feature of the first target tracking result based on the multi-scale template ROI feature and the ROI feature of the first target tracking result, and the ROI feature of the first target tracking result may include ROI features of respective scales.

For the determining of the scale feature of the first target tracking result based on the multi-scale template ROI feature and the ROI feature of the first target tracking result, the processor may be configured to determine the scale feature of the first target tracking result by calculating a correlation between the multi-scale template ROI feature and the ROI feature of the first target tracking result.

In another general aspect, a processor-implemented method with target tracking may include: determining a multi-scale template region of interest (ROI) feature based on a first target tracking result generated based on a search region of a frame image; determining an ROI feature of the first target tracking result; determining a scale feature of the first target tracking result based on the multi-scale template ROI feature and the ROI feature of the first target tracking result; predicting a scale of a target in the search region based on the scale feature of the first target tracking result; and generating a second target tracking result by adjusting the first target tracking result based on a result of the predicting.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, devices, and/or systems described herein. However, various changes, modifications, and equivalents of the methods, devices, and/or systems described herein will be apparent after an understanding of the disclosure of this application. For example, the sequences of operations described herein are merely examples, and are not limited to those set forth herein, but may be changed with the exception of operations necessarily occurring in a certain order. Also, descriptions of features that are known after understanding of the disclosure of this application may be omitted for increased clarity and conciseness.

The terminology used herein is for the purpose of describing particular examples only and is not to be limiting of the examples. As used herein, the singular forms "a", "an", and "the" include the plural forms as well, unless the context clearly indicates otherwise. It will be further understood that the terms "comprises/comprising" and/or "includes/including" when used herein, specify the presence of stated features, integers, steps, operations, elements, components, and/or combinations thereof, but do not preclude the presence or addition of one or more other features, integers, steps, operations, elements, components and/or combinations thereof. As used herein, the term "and/or" includes any one and any combination of any two or more of the associated listed items. The use of the term "may" herein with respect to an example or embodiment (for example, as to what an example or embodiment may include or implement) means that one or more examples or embodiments exists where such a feature is included or implemented, while all examples are not limited thereto.

Unless otherwise defined, all terms used herein including technical or scientific terms have the same meanings as those generally understood consistent with and after an understanding of the present disclosure. Terms, such as those defined in commonly used dictionaries, should be construed to have meanings matching with contextual meanings in the relevant art and the present disclosure, and are not to be construed as an ideal or excessively formal meaning unless otherwise defined herein.

When describing the examples with reference to the accompanying drawings, like reference numerals refer to like components and a repeated description related thereto will be omitted. In the description of examples, detailed description of well-known related structures or functions will be omitted when it is deemed that such description will cause ambiguous interpretation of the present disclosure.

Although terms of "first," "second," and "third" may be used to describe various components, members, regions, layers, or sections, these components, members, regions, layers, or sections are not to be limited by these terms (e.g., "first," "second," and "third"). Rather, these terms are only used to distinguish one component, member, region, layer, or section from another component, member, region, layer, or section. Thus, for example, a "first" component, member, region, layer, or section referred to in examples described herein may also be referred to as a "second" component, member, region, layer, or section, and a "second" component, member, region, layer, or section referred to in examples described herein may also be referred to as the "first" component without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there may be no other elements intervening therebetween. Likewise, similar expressions, for example, "between" and "immediately between," and "adjacent to" and "immediately adjacent to," are also to be construed in the same.

The same name may be used to describe an element included in the examples described above and an element having a common function. Unless otherwise mentioned, the descriptions of the examples may be applicable to the following examples and thus, duplicated descriptions will be omitted for conciseness.

Typical object tracking may reposition a lost target by using a matching network (e.g., a Siamese network) or a tracker. This is because the tracking or matching in the typical object tracking may only be suitable for objects having a size scale within a certain range. The typical object tracking may require a scale search method for matching a target with a plurality of scales at the same time. The tracker or matching network may input images having a plurality of scales and output a corresponding candidate bounding box under each scale and corresponding reliability. A candidate bounding box having the highest reliability score may be selected as a re-detection result. A scale problem may be accounted for when target matching for a limited number of images with different scales, and the calculation consumption of the tracker or the matching network is small, and thus, relatively better real-time performance may be obtained.

However, in a typical search detection process, multiple matches for tracking a search image in an environment with different scales may be used to predict the reliability score of a target in the environment with the different scales. Accordingly, in the typical search detection process, a large amount of computing resources are consumed, and the real-time performance of the tracker may also deteriorate.

One or more embodiments of the present disclosure include a state estimating and scale predicting method based on a scale feature. In addition, in order to solve the problem regarding a large amount of calculation consumption of the typical scale search method, one or more embodiments of the present disclosure may perform matching between a current candidate region and multi-scale by using a template to generate a scale feature including scale information. In a search detection process of one or more embodiments based on the scale feature, a scale of a target may be predicted in a candidate region and targets having different scales may be detected.

Figure 1:
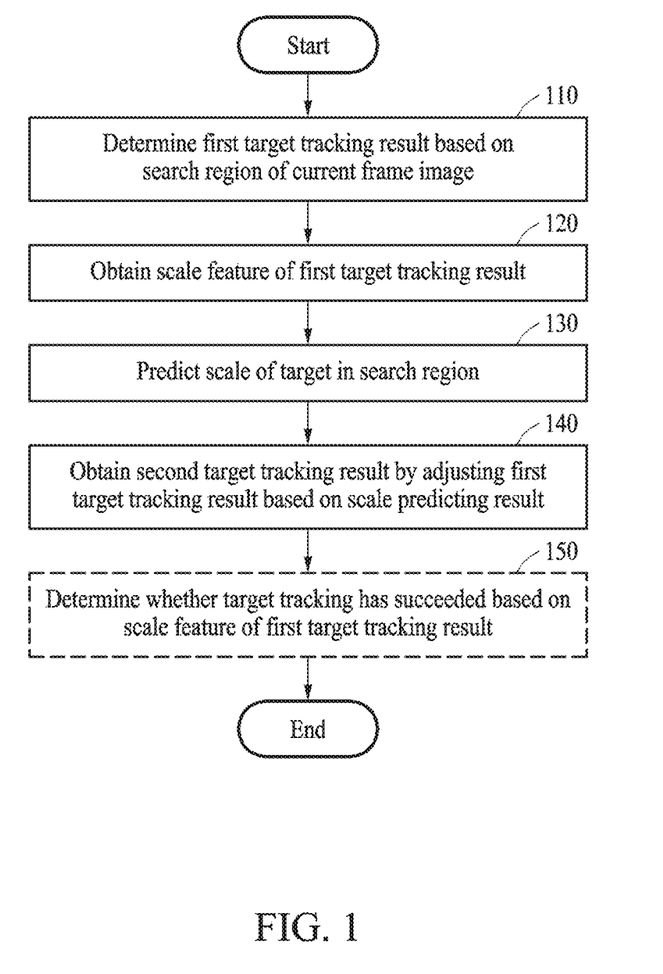
FIG. 1 illustrates an example of a target tracking method.

FIG. 1 illustrates an example of a target tracking method. Operations 110 through 150 to be described hereinafter may be performed in sequential order, but may not be necessarily performed in sequential order. For example, the operations 110 through 150 may be performed in different orders, and at least two of the operations 110 through 150 may be performed in parallel or simultaneously. Further, one or more of operations 110 through 150 may be omitted, without departing from the spirit and scope of the shown examples. The operations 110 through 150 to be described hereinafter with reference to FIG. 1 may be performed by one or more components of an electronic device (e.g., a target tracking apparatus 800 of FIG. 8 and/or a computing apparatus 900 of FIG. 9) described herein.

Referring to FIG. 1, in the target tracking method, in operation 110, a first target tracking result may be determined (e.g., generated) based on a search region of a current frame image.

In an example, the first target tracking result may include a first tracking bounding box.

In an example, the search region may be the entire region of the current frame image or a region larger than a target tracking result of a previous frame image (e.g., a frame image before the current frame image among a plurality of frame images). For example, when it is determined that the target tracking of the current frame image has failed, the target tracking method may re-track a target of the current frame image. That is, in the target tracking method, the target may be re-searched by re-determining the target tracking result of the current frame image, and the first target tracking result may be determined by setting the entire region of the image or the region larger than the target tracking result of the previous frame image as the search region.

In an example, in the target tracking method, when it is determined that the target tracking of the current frame image has failed, the entire image search region may be determined as the first target tracking result. In another example, in the target tracking method, when it is determined that the target tracking of the current frame image has failed, the region larger than the target tracking result of the previous frame image may be determined as the first target tracking result.

In an example, the search region may be determined based on the target tracking result of the previous frame image. For example, in the target tracking method, when it is determined that the target tracking of the previous frame image has succeeded, the target tracking result of the previous frame image may be determined as the first target tracking result.

In an example, the first target tracking result may also be adjusted based on an appearance feature of the first target tracking result.

In operation 120 of the target tracking method, a scale feature of the first target tracking result may be obtained (e.g., determined).

In an example, in the target tracking method, when obtaining the scale feature of the first target tracking result in operation 120, a multi-scale template region of interest (ROI) feature may be obtained to obtain an ROI feature of the first target tracking result, and the scale feature of the first target tracking result may be determined based on the multi-scale template ROI feature and the ROI feature of the first target tracking result. The ROI feature of the first target tracking result herein may include ROI features of respective scales.

In an example, in operation 120 of the target tracking method, before the scale feature of the first target tracking result is determined based on the multi-scale template ROI feature and the ROI feature of the first target tracking result, the ROI features of the respective scales included in the ROI feature of the first target tracking result may be aligned based on the appearance feature of the first target tracking result. For example in operation 120, the scale feature of the first target tracking result may be determined based on the multi-scale template ROI feature and the aligned ROI features of the respective scales.

Figure 2:
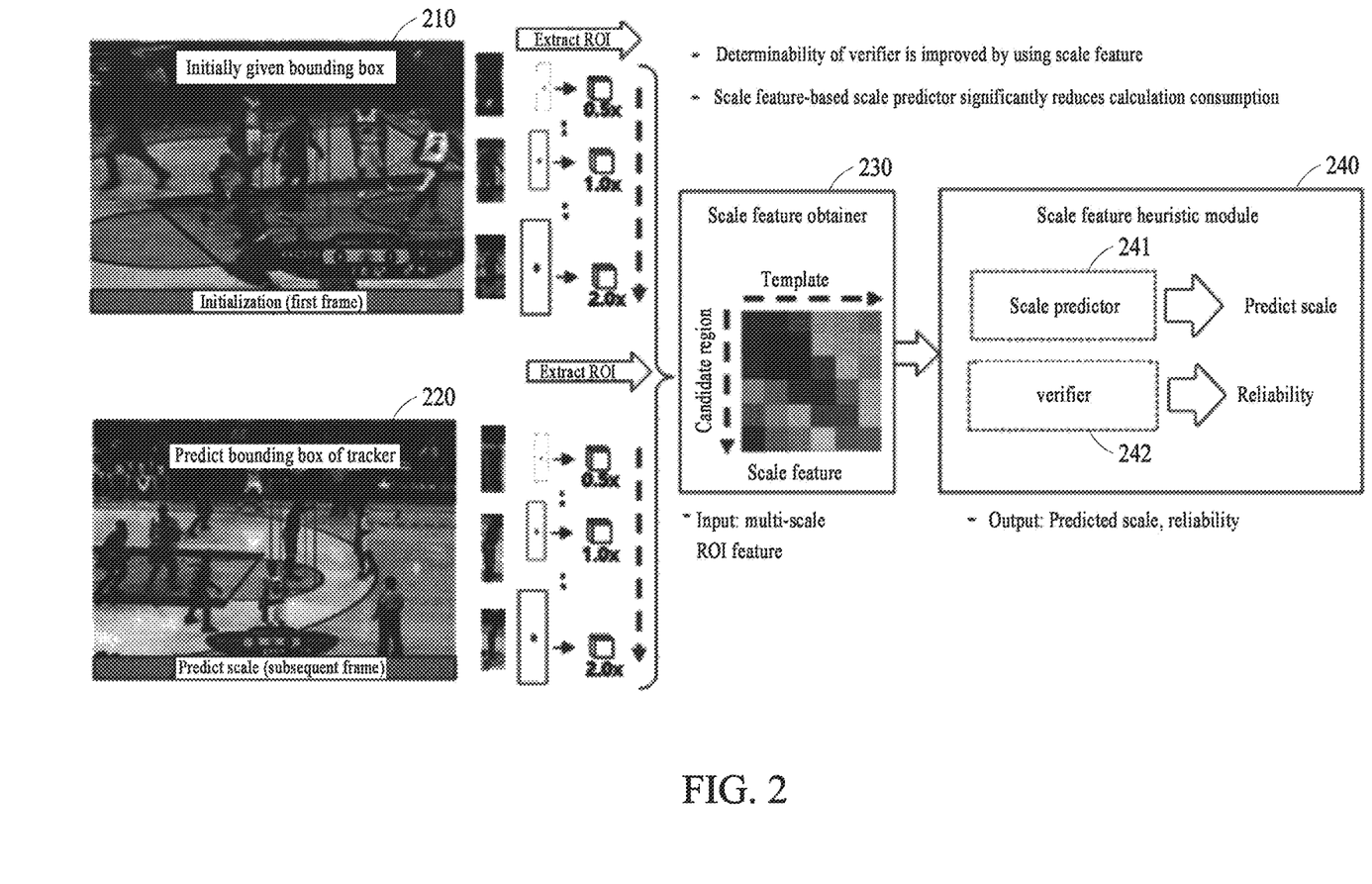
FIG. 2 illustrates an example of a target tracking flow.

FIG. 2 illustrates an example of a target tracking flow.

Referring to FIG. 2, in the target tracking method, a first frame image $I_1$ 210 of a video may be obtained and combined with a designated initial target object bounding box $b_0$, the image $I_1$ may be cut out to obtain a target object image Z, and then a depth feature $F_Z$ of the image Z may be extracted by using a convolutional neural network. In the target tracking method, a t-th frame image $I_t$ 220 of the video may be obtained, the image $I_t$ may be cut out along a predicted target object bounding box (that is, a target object bounding box of $I_{t-1}$) of a previous frame to obtain a search region image $X_t$, and a depth feature $F_{X_t}$ of the search region image $X_t$ may be extracted by using the convolutional neural network.

In addition, in the target tracking method, a target object bounding box $B_t$ of a target object in the image 220 of the t-th frame may be predicted.

Furthermore, in the target tracking method, the bounding box $B_t$ may be adjusted to obtain a bounding box $B_{t'}$ by a scale feature obtainer 230 based on the depth feature $F_Z$ of the image Z and the depth feature $F_{X_t}$ of the search region image $X_t$. In the target tracking method, the aligned ROI features $R_{X1-kx}$ of the bounding box $B_{t'}$ of $k_x$ scales may be generated by the scale feature obtainer 230 based on the bounding box $B_{t'}$, and template ROI features $R_{z1-kz}$ of $k_z$ scales may be generated based on the initial target object bounding box $b_0$ in the first frame of the video. In addition, in the target tracking method, the features $R_{X1-kx}$ and $R_{z1-kz}$ may be matched with the multi-scale through a scale predictor 241 of a scale feature heuristic module 240 to obtain a scale feature $F_{S_t}$.

In an example, in the target tracking method, when determining the scale feature of the first target tracking result based on the multi-scale template ROI feature and the ROI feature of the first target tracking result, the scale feature of the first target tracking result may be obtained by calculating a correlation between the multi-scale template ROI feature and the ROI feature of the first target tracking result.

In an example, in the target tracking method, when performing correlation calculation for the multi-scale template ROI feature and the ROI feature of the first target tracking result, each correlation between the ROI feature of each scale from the ROI feature of the first target tracking result and the scale of the multi-scale template ROI feature may be calculated.

Figure 3:
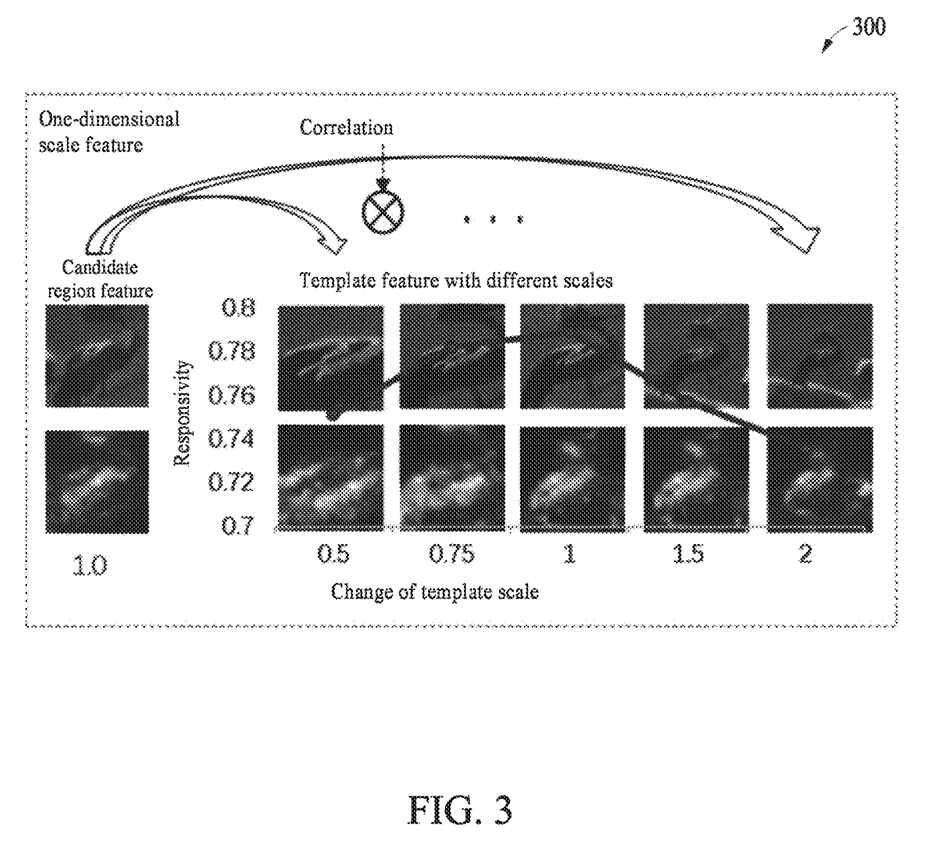
FIG. 3 illustrates an example of a one-dimensional scale feature.

FIG. 3 illustrates an example of a one-dimensional scale feature.

Referring to FIG. 3, in an example, the ROI feature of the first target tracking result may include one scale ROI feature, and the scale feature of the first target tracking result may include a one-dimensional scale feature 300. It may be confirmed that the one-dimensional scale feature 300 has the same feature as in the example of FIG. 3.

Figure 4:
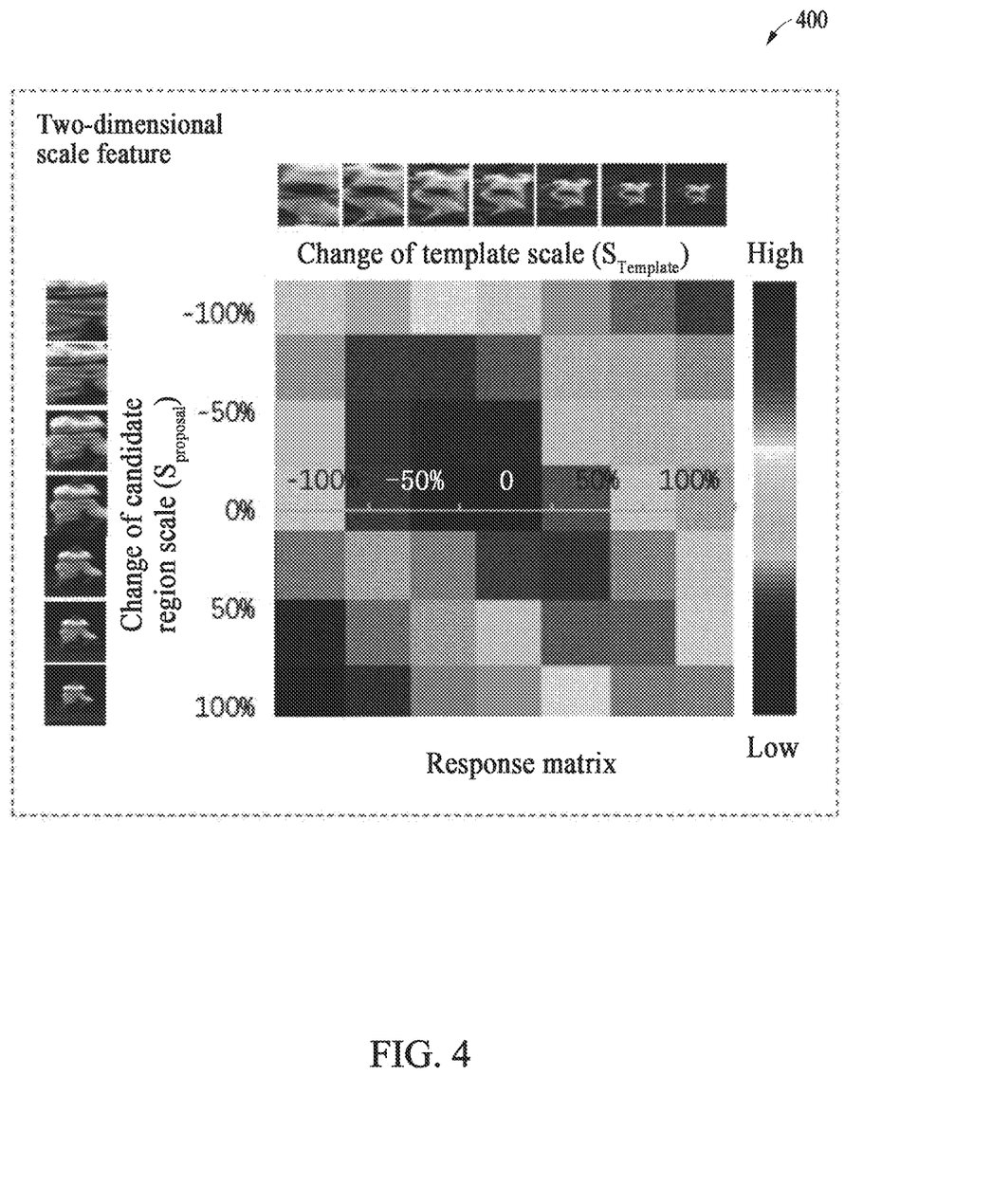
FIG. 4 illustrates an example of a two-dimensional scale feature.

FIG. 4 illustrates an example of a two-dimensional scale feature.

In an example, the ROI feature of the first target tracking result may include an ROI feature with a plurality of scales, and the scale feature of the first target tracking result may include a two-dimensional scale feature 400. It may be confirmed that the two-dimensional scale feature 400 has the same feature as in the example of FIG. 4. In an example, the second target tracking result may include a second tracking bounding box.

In the target tracking method, a responsivity Y indicating similarity between two images may be obtained by performing the correlation calculation in an image operation. In the target tracking method, as a value of the responsivity Y is large, it may be determined that similarity between a corresponding position on a search region image Z and a target object image X is high.

The correlation calculation may be Equation 1 below, for example.

$$Y(i, j) = \sum_{u=-h/2}^{h/2} \sum_{v=-w/2}^{w/2} X[u, y] \cdot Z[i+u, j+v] \quad \text{Equation 1}$$

In Equation 1, Y(i,j) represents the similarity between the target object image X and the search region image Z, h and w represent sizes of the target object image X, and i, j, u, and v represent coordinates of each image.

The scale feature may be obtained even between features with different scales by performing the correlation calculation between the features with different scales, and the detailed calculation of the scale feature is as below.

For the one-dimensional scale feature, a scale correlation between the multi-scale template feature and a single-scale candidate region (a predicted bounding box) may be calculated, and the computational cost may be low when the multi-scale template feature is only generated once when a tracking system is initialized. For example, the one-dimensional scale feature may be obtained by performing the correlation calculation of Equation 2 below, for example, for the ROI feature of the predicted bounding box and the ROI feature of the $k_z$ template bounding boxes with different scalps by using the following equation.

$$S(s_z, i, j) = \sum_{u=-h/2}^{h/2} \sum_{v=-w/2}^{w/2} f_x[u, v] \cdot f_{z_{s_z}}[i+u, j+v] \quad \text{Equation 2}$$

In Equation 2, $S(s_z,i,j)$ represents the one-dimensional scale feature, $f_x$ represents the ROI feature of the predicted bounding box, $f_z$ represents the ROI feature of the template bounding box, and $s_z$ represents a measure of the ROI feature of the template bounding box.

The multi-scale correlation calculation of the two-dimensional scale feature may extend to a candidate region with a different scale (that is, the predicted bounding box) based on the one-dimensional scale feature. Compared to the one-dimensional scale feature, the two-dimensional scale feature contains more scale information, which may help to improve performance of a correlation module implementing the scale feature. For example, the two-dimensional scale feature may be obtained by performing the correlation calculation of Equation 3 below, for example, for the ROI features of the predicted $k_x$ bounding boxes with different scales and the ROI feature of the $k_z$ template bounding boxes with different scales by using the following equation.

$$S(s_x, s_z, i, j) = \sum_{u=-h/2}^{h/2} \sum_{v=-w/2}^{w/2} f_{x_{s_x}}[u, v] \cdot f_{z_{s_z}}[i+u, j+v]$$ Equation 3

In Equation 3, $S(s_x, s_z, i, j)$ represents the two-dimensional scale feature and sx represents the scale of the ROI feature of the predicted bounding box.

Figure 5:
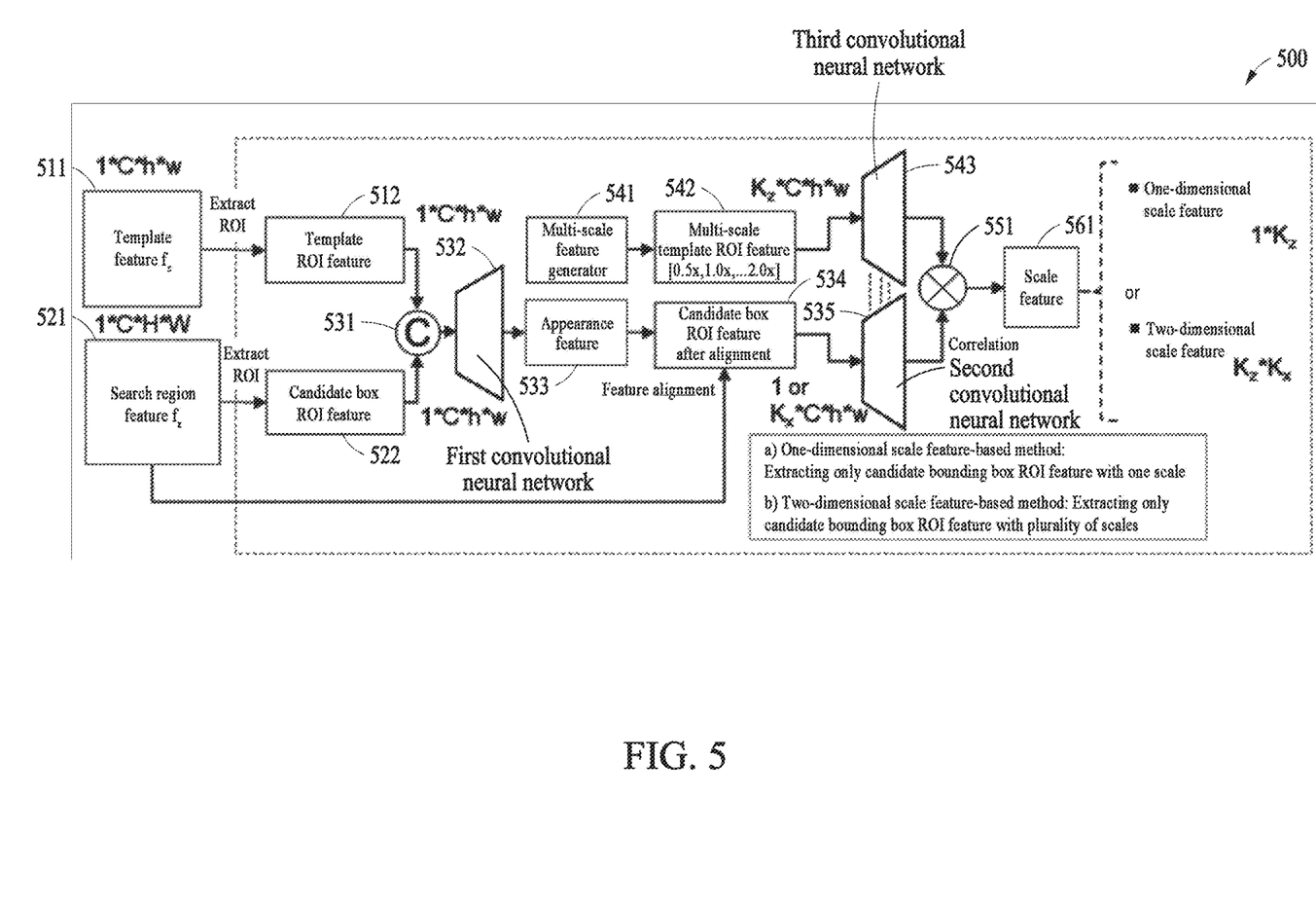
FIG. 5 illustrates an example of an operation of a scale feature obtainer.

FIG. 5 illustrates an example of an operation of a scale feature obtainer.

Referring to FIG. 5, in operation 531, when a template ROI feature 512 extracted from a template feature 511 and a candidate box ROI feature 522 corresponding to a predicted bounding box extracted from a search region feature 521 are received, a scale feature obtainer 500 may generate an original tracking result by using the template ROI feature 512 and the candidate box ROI feature 522.

The scale feature obtainer 500 may perform mining of appearance feature 533 from the original tracking result by using a first convolutional neural network 532, and may obtain a candidate box ROI feature after alignment 534 by performing feature alignment of additionally adjusting a center offset of a target object (e.g., a desired object) in the predicted bounding box. The feature alignment herein may indicate that an object in a bounding box is aligned at the center of the bounding box as much as possible.

The scale feature obtainer 500 may generate a multi-scale template ROI feature 542 by using a multi-scale feature generator 541.

The scale feature obtainer 500 may perform mining of scale information of each of the candidate box ROI features in response to the alignment 534 and the generating of the multi-scale template ROI feature 542 by using a second convolutional neural network 535 and a third convolutional neural network 543, and generate a scale feature 561 by performing the multi-scale correlation between the features generated by the second and third convolutional neural networks 535 and 543 by using a correlator 551.

The scale feature obtainer 500 may calculate a one-dimensional scale through Equation 4 below, for example, using the ROI feature of the template bounding box having the same size and the ROI feature of the predicted bounding box.

$$S1(s_z, i, j) = \sum_{u=-h/2}^{h/2} \sum_{v=-w/2}^{w/2} f_x[u, v] \cdot f_{z_{s_z}}[u, v]$$ Equation 4

In Equation 4, $S1(s_z, i, j)$ represents a one-dimensional scale and a dimension of a scale feature S1 is $1 \times K_z$.

The scale feature obtainer 500 may calculate a two-dimensional scale through Equation 5 below, for example, using the ROI feature of the template bounding box having the same size and the ROI feature of the predicted bounding box.

$$S2(s_x, s_Z, i, j) = \sum_{u=-h/2}^{h/2} \sum_{v=-w/2}^{w/2} f_{x_{s_x}}[u, v] \cdot f_{z_{s_z}}[u, v]$$ Equation 5

In Equation 5, $S2(s_x, s_z, i, j)$ represents a two-dimensional scale and a dimension of a scale feature S2 is $k_z \times K_x$.

Returning to the description of FIG. 1, in operation 130 of the target tracking method, the scale of the target in the search region may be predicted based on the scale feature of the first target tracking result.

In an example, in operation 130 of the target tracking method, when predicting the scale of the target in the search region based on the scale feature of the first target tracking result, a maximum scale response value may be selected among scale response values included in the scale feature of the first target tracking result, and then a scale corresponding to the maximum scale response value may be predicted as the scale of the target in the search region.

In an example, in the target tracking method, when the scale of the target in the search region is predicted based on the scale feature of the first target tracking result, the scale of the target in the search region may be obtained by inputting the scale feature to a predetermined convolutional neural network.

In operation 140 of the target tracking method, the second target tracking result may be obtained by adjusting the first target tracking result based on a scale predicting result.

In the target tracking method of one or more embodiments, when the first target tracking result is adjusted based on the scale predicting result, a large-scale drift occurring in the target tracking process may be reduced, thereby increasing an accuracy of a target tracking effect. In the target tracking method of one or more embodiments, when the first target tracking result is adjusted based on the scale predicting result in a re-detection process in response to the target tracking failure (also referred to as a target tracking re-detection process), the calculation cost of the re-detection process may be reduced.

In an example, in the target tracking method, when the second target tracking result is obtained in operation 140, it may be determined whether the target tracking has succeeded based on the scale feature of the first target tracking result in operation 150. In the target tracking method, when estimating a target tracking state, the target tracking state may be accurately estimated by using the scale feature.

In an example, in the target tracking method, when determining whether the target tracking has succeeded based on the scale feature of the first target tracking result in operation 150, the appearance feature of the first target tracking result may be obtained, and it may be determined whether the target tracking has succeeded based on the appearance feature and the scale feature of the first target tracking result.

For example, as shown in FIG. 2, a verifier 242 of the scale feature heuristic module 240 may first predict a bounding box scale and reliability based on the scale feature $F_{St}$. The scale predictor 241 may predict a current scale according to the scale feature $F_{St}$. The verifier 242 used to guide the scale feature may estimate the reliability of the bounding box according to a distribution pattern of the scale feature $F_{St}$ and the appearance features $F_{Xt}$ and $F_Z$.

Figure 6:
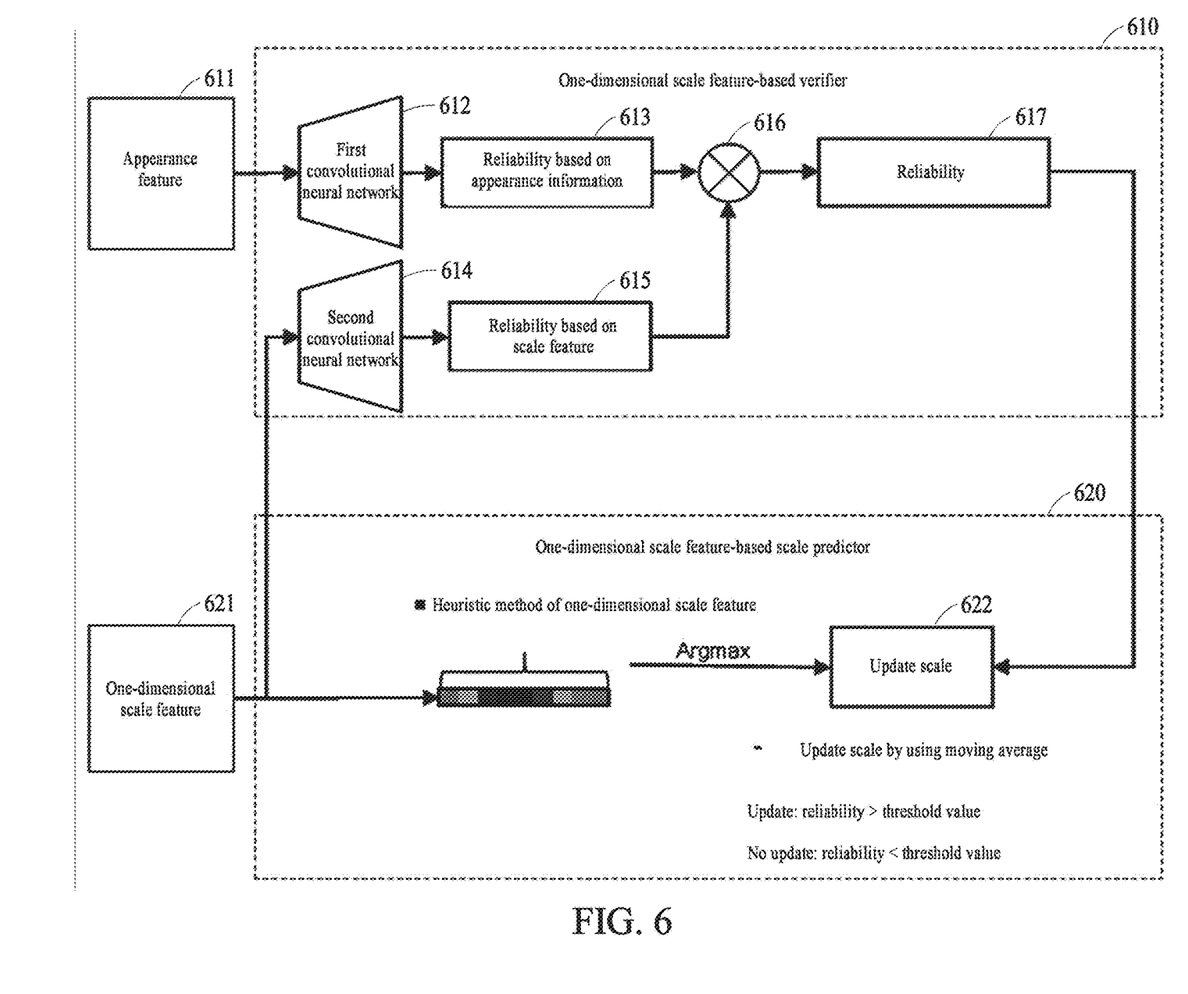
FIG. 6 illustrates an example of operations of a scale predictor and a verifier based on a one-dimensional scale feature.

FIG. 6 illustrates an example of operations of a scale predictor and a verifier based on one-dimensional scale features.

Referring to FIG. 6, a scale predictor 620 may determine a current scale according to a size of a scale response based on a one-dimensional scale feature 621. A verifier 610 may calculate reliability 613 based on appearance information from appearance feature 611 through a first convolutional neural network 612, and calculate reliability 615 based on a scale feature from the one-dimensional scale feature 621 through a second convolutional neural network 614.

The verifier 610 may calculate and output final reliability 617 by fusing the reliability 613 based on the appearance information with the reliability 615 based on the scale feature in operation 616. The target tracking based on the one-dimensional scale features may be accurate for scenes with low computational demands.

Meanwhile, in operation 622, the scale predictor 620 may perform a scale update based on the reliability 617 confirmed by the verifier 610.

Figure 7:
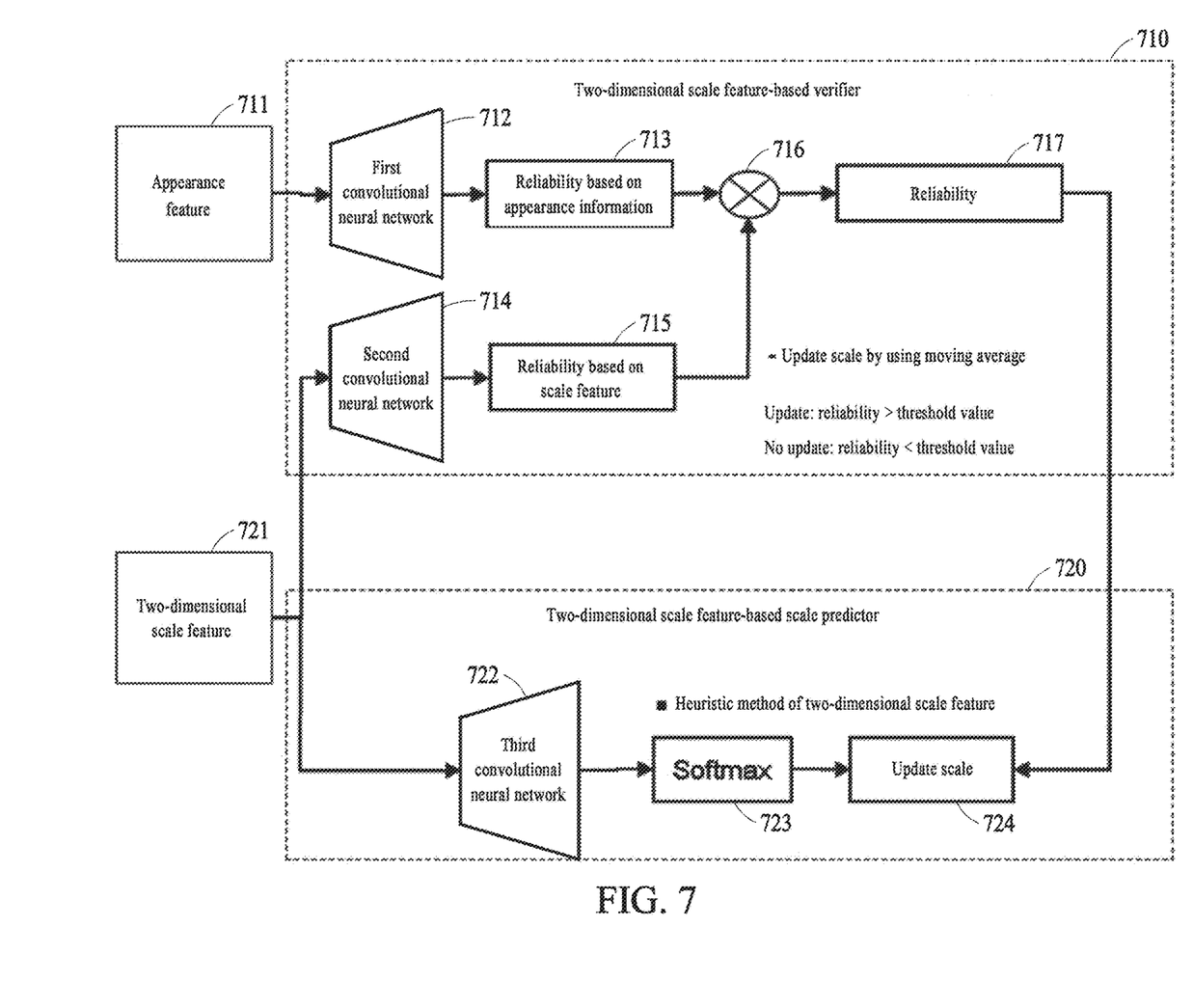
FIG. 7 illustrates an example of operations of a scale predictor and a verifier based on a two-dimensional scale feature.

FIG. 7 illustrates an example of operations of a scale predictor and a verifier based on two-dimensional scale features.

Referring to FIG. 7, a scale predictor 720 may mine scale information of a two-dimensional scale feature 721 by using a third convolutional neural network 722 and a softmax 723 function based on the two-dimensional scale feature 721.

The verifier 710 may calculate reliability 713 based on appearance information from appearance feature 711 through a first convolutional neural network 712, and calculate reliability 715 based on a scale feature from the two-dimensional scale feature 721 through a second convolutional neural network 714.

The verifier 710 may calculate and output final reliability 717 by fusing the reliability 713 based on the appearance information with the reliability 715 based on the scale feature in operation 716. The target tracking based on the two-dimensional scale features may be more accurate for scenes requiring high performance than the target tracking based on the one-dimensional scale features.

Meanwhile, in operation 724, the scale predictor 720 may perform a scale update based on the reliability 717 confirmed by the verifier 710.

In operations 110 to 150 of FIG. 1, the target may be tracked by performing target object scale prediction for the current frame image of the video, and then the target may be tracked by performing the target object scale prediction for a subsequent frame image (e.g., $I_{t+1}$) of the current frame image (e.g., $I_t$) of the video.

The target tracking method of one or more embodiments may reduce a large-scale drift occurring in the target tracking process, thereby increasing the target tracking effect. In addition, the calculation cost of the re-detection process may be reduced by using the target tracking method of one or more embodiments. Furthermore, the target tracking method of one or more embodiments may accurately estimate the target tracking state, thereby increasing accuracy of the target tracking.

Hereinabove, the target tracking method according to an example has been described above with reference to FIGS. 1 to 7. Hereinafter, a target tracking apparatus and a configuration thereof will be described with reference to FIG. 8.

Figure 8:
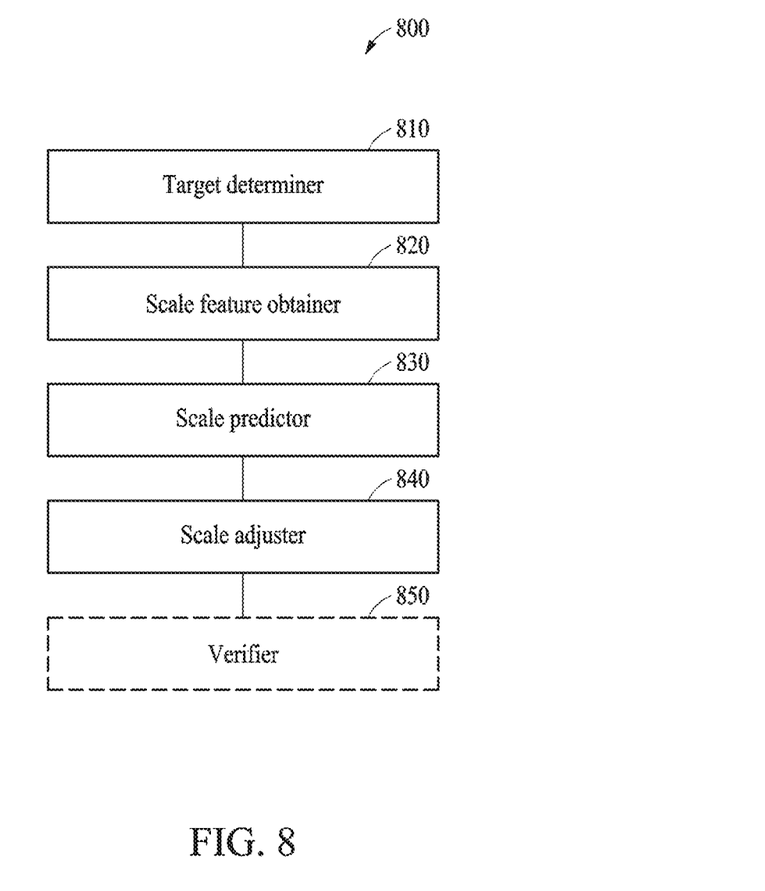
FIG. 8 illustrates an example of a configuration of a target tracking apparatus.

FIG. 8 illustrates an example of a configuration of a target tracking apparatus.

Referring to FIG. 8, a target tracking apparatus 800 may include a target determiner 810, a scale feature obtainer 820, a scale predictor 830, and a scale adjuster 840. In addition, the target tracking apparatus 800 may further include a verifier 850.

The target determiner 810 may determine a first target tracking result based on a search region of a current frame image of a video.

In an example, the first target tracking result may include a first tracking bounding box.

In an example, the search region may be the entire image search region or a region larger than a target tracking result of a previous frame image.

In an example, the search region may be determined based on the target tracking result of the previous frame image.

In an example, the target tracking apparatus 800 may further include a feature adjuster (not shown) configured to adjust the first target tracking result based on an appearance feature of the first target tracking result.

The scale feature obtainer 820 may obtain a scale feature of the first target tracking result.

In an example, the scale feature obtainer 820 may obtain a multi-scale template ROI feature, obtain an ROI feature of the first target tracking result, and determine the scale feature of the first target tracking result based on the multi-scale template ROI feature and the ROI feature of the first target tracking result. In this case, the ROI feature of the first target tracking result may include an ROI feature of one or more scales.

In an example, the target tracking device 800 may further include a feature aligner (not shown) configured to align the ROI features of each scale from the ROI feature of the first target tracking result based on the appearance feature of the first target tracking result.

In an example, the scale feature obtainer 820 may be configured to obtain the scale feature of the first target tracking result by performing correlation calculation of the multi-scale template ROI feature and the ROI feature of the first target tracking result.

In an example, the scale feature obtainer 820 may be configured to perform correlation calculation of the ROI feature of each scale from the ROI feature of the first target tracking result, together with the multi-scale template feature.

In an example, the ROI feature of the first target tracking result may include one scale ROI feature, and the scale feature of the first target tracking result may include a one-dimensional scale feature.

In an example, the ROI feature of the first target tracking result may include an ROI feature with a plurality of scales, and the scale feature of the first target tracking result may include a two-dimensional scale feature.

The scale predictor 830 may predict the scale of the target of the search region based on the scale feature of the first target tracking result.

The scale adjuster 840 may obtain a second target tracking result by adjusting the first target tracking result based on the scale predicting result.

In an example, the second target tracking result may include a second tracking bounding box.

The verifier 850 may determine whether the target tracking has succeeded based on the scale feature of the first target tracking result.

In an example, the verifier 850 may obtain the appearance feature of the first target tracking result, and determine whether the target tracking has succeeded based on the appearance feature and the scale feature of the first target tracking result.

Hereinabove, the target tracking apparatus 800 according to an example has been described above with reference to FIG. 8. Next, an example of a computing apparatus will be described with reference to FIG. 9.

Figure 9:
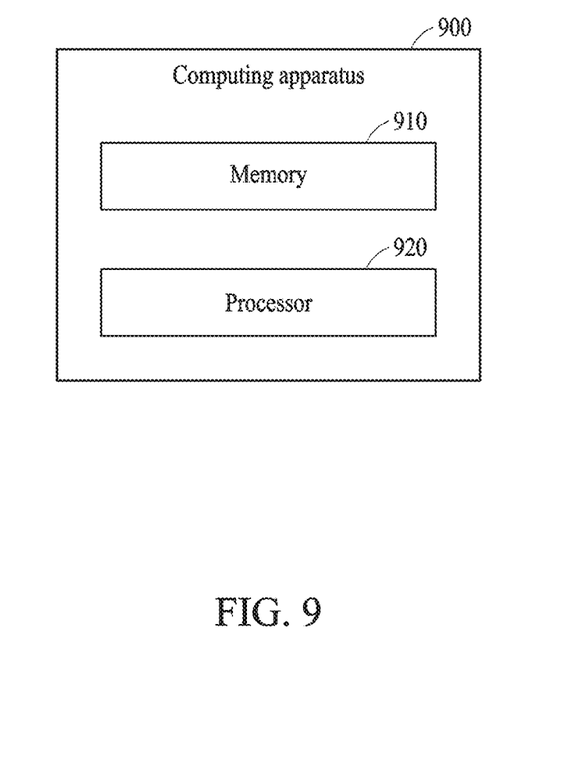
FIG. 9 illustrates an example of a configuration of a computing apparatus.

FIG. 9 illustrates an example of a configuration of a computing apparatus.

Referring to FIG. 9, a computing apparatus 900 includes a memory 910 (e.g., one or more memories) storing a computer program and a processor 920 (e.g., one or more processors). The computing apparatus 900 may be or include the target tracking device 800 of FIG. 8. When the computer program is executed by the processor 920, the target tracking method according to an example is implemented. The memory 910 may be or include a non-transitory computer-readable storage medium storing instructions that, when executed by the processor 920, configure the processor 920 to perform any one, any combination, or all of the operations and methods described herein with reference to FIGS. 1-8. The processor 920 may perform any one, any combination, or all of the operations and methods described herein with references to FIGS. 1-8.

In an example, when the computer program is executed by the processor 920, a first target tracking result may be determined based on a search region of a current frame image, a scale feature of the first target tracking result may be obtained, a scale of a target in the search region may be predicted based on the scale feature of the first target tracking result, and a second target tracking result may be obtained by adjusting the first target tracking result based on the scale predicting result.

In an example, the computing apparatus 900 may include apparatuses such as a mobile phone, a laptop, a personal digital assistant (PDA), a pad, and a desktop computer, but is not limited thereto. The computing apparatus 900 shown in FIG. 9 is merely an example, and should not impose any limitation on functions and scope of use of the example of the present disclosure.

Hereinabove, the target tracking method and apparatus according to an example has been described above with reference to FIGS. 1 to 9. However, the target tracking apparatus 800 shown in FIG. 8 may be implemented by software, hardware, firmware, or any combination thereof to perform predetermined functions. The computing apparatus 900 shown in FIG. 9 is not limited to including the above-described components, some components may be added, and components may also be combined.

According to the target tracking method and apparatus of an example, a first target tracking result may be determined based on a search region of a current frame image, a scale feature of the first target tracking result may be obtained, a scale of a target in the search region may be predicted based on the scale feature of the first target tracking result, and a second target tracking result may be obtained by adjusting the first target tracking result based on the scale predicting result.

In an example, in the target tracking method, an initialized target tracking result of a first frame of a video and a target tracking result of a subsequent frame of the video that is output through the video as input data of an artificial intelligence (AI) model may be obtained.

The AI model may be obtained through training. Here, "being obtained through training" may refer to obtaining a predefined operation rule or AI model that is configured to perform a desired feature (or objective) by training a basic AI model with a plurality of sets of training data through a training algorithm.

For example, the AI model may include a plurality of neural network layers. Each of the plurality of neural network layers may include a plurality of weight values, and a neural network computation may be performed by a calculation between a calculation result from a previous layer and the plurality of weight values.

Similarly to human visual perception, visual understanding may be technology for recognizing and processing an object including object recognition, object tracking, image search, human recognition, scene recognition, 3D reconstruction/positioning, or image augmentation.

The scale feature obtainers, scale feature heuristic modules, scale predictors, verifiers, target tracking apparatuses, target determiners, scale adjusters, computing apparatuses, memories, processors, scale feature obtainer 230, scale feature heuristic module 240, scale predictor 241, verifier 242, scale feature obtainer 500, verifier 610, scale predictor 620, verifier 710, scale predictor 720, target tracking apparatus 800, target determiner 810, scale feature obtainer 820, scale predictor 830, scale adjuster 840, verifier 850, computing apparatus 900, memory 910, processor 920, and other apparatuses, units, modules, devices, and components described herein with respect to FIGS. 1-9 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method with target tracking, the method comprising:
    generating a first target tracking result based on a search region of a current frame image;
    determining a scale feature of the first target tracking result;
    predicting a scale of a target in the search region based on the scale feature of the first target tracking result; and
    generating a second target tracking result by adjusting the first target tracking result based on a scale predicting result, and
    determining whether target tracking has succeeded based on the scale feature of the first target tracking result.

2. The method of claim 1, wherein the search region is either one of an entire region of the current frame image and a region larger than a target tracking result of a previous frame image.

3. The method of claim 1, wherein the search region is determined based on a target tracking result of a previous frame image.

4. The method of claim 1, wherein
    the first target tracking result comprises a first tracking bounding box, and
    the second target tracking result comprises a second tracking bounding box.

5. The method of claim 1, wherein the determining of whether the target tracking has succeeded based on the scale feature of the first target tracking result comprises:
    determining an appearance feature of the first target tracking result; and
    determining whether the target tracking has succeeded based on the appearance feature of the first target tracking result and the scale feature of the first target tracking result.

6. The method of claim 5, further comprising:
    adjusting the first target tracking result based on the appearance feature of the first target tracking result.

7. The method of claim 1, wherein
    the determining of the scale feature of the first target tracking result comprises:
    determining a multi-scale template region of interest (ROI) feature;

determining an ROI feature of the first target tracking result; and determining the scale feature of the first target tracking result based on the multi-scale template ROI feature and the ROI feature of the first target tracking result, and the ROI feature of the first target tracking result comprises ROI features of respective scales.

8. The method of claim 7, wherein the determining of the scale feature of the first target tracking result based on the multi-scale template ROI feature and the ROI feature of the first target tracking result comprises:

performing feature alignment of each of the ROI features of the respective scales comprised in the ROI feature of the first target tracking result, based on an appearance feature of the first target tracking result; and determining the scale feature of the first target tracking result based on the feature-aligned ROI features of the respective scales.

9. The method of claim 7, wherein the determining of the scale feature of the first target tracking result based on the multi-scale template ROI feature and the ROI feature of the first target tracking result comprises:

determining the scale feature of the first target tracking result by calculating a correlation between the multi-scale template ROI feature and the ROI feature of the first target tracking result.

10. The method of claim 9, wherein the determining of the scale feature of the first target tracking result by calculating the correlation between the multi-scale template ROI feature and the ROI feature of the first target tracking result comprises:

calculating each correlation between the ROI feature of each scale from the ROI feature of the first target tracking result and a scale of the multi-scale template ROI feature.

11. The method of claim 7, wherein
the ROI feature of the first target tracking result comprises a single-scale ROI feature, and
the scale feature of the first target tracking result comprises a one-dimensional scale feature.

12. The method of claim 7, wherein
the ROI feature of the first target tracking result comprises a multi-scale ROI feature, and
the scale feature of the first target tracking result comprises a two-dimensional scale feature.

13. An apparatus with target tracking, the apparatus comprising:
a processor configured to:
determine a first target tracking result based on a search region of a current frame image;
obtain a scale feature of the first target tracking result;
predict a scale of a target in the search region based on the scale feature of the first target tracking result;
obtain a second target tracking result by adjusting the first target tracking result based on a scale predicting result, and determine whether target tracking has succeeded based on the scale feature of the first target tracking result.

14. The apparatus of claim 13, wherein the search region is either one of an entire region of the current frame image and a region larger than a target tracking result of a previous frame image.

15. The apparatus of claim 13, wherein the search region is determined based on a target tracking result of a previous frame image.

16. The apparatus of claim 13, wherein, for the determining of whether the target tracking has succeeded based on the scale feature of the first target tracking result, the processor is configured to:

determine an appearance feature of the first target tracking result; and determine whether the target tracking has succeeded based on the appearance feature of the first target tracking result and the scale feature of the first target tracking result.

17. The apparatus of claim 13, wherein
for the determining of the scale feature of the first target tracking result, the processor is configured to:
determine a multi-scale template region of interest (ROI) feature;
determine an ROI feature of the first target tracking result; and
determine the scale feature of the first target tracking result based on the multi-scale template ROI feature and the ROI feature of the first target tracking result, and
the ROI feature of the first target tracking result comprises ROI features of respective scales.

18. The apparatus of claim 17, wherein, for the determining of the scale feature of the first target tracking result based on the multi-scale template ROI feature and the ROI feature of the first target tracking result, the processor is configured to:

determine the scale feature of the first target tracking result by calculating a correlation between the multi-scale template ROI feature and the ROI feature of the first target tracking result.

19. A processor-implemented method with target tracking, the method comprising:

determining a multi-scale template region of interest (ROI) feature based on a first target tracking result generated based on a search region of a frame image;

determining an ROI feature of the first target tracking result;

determining a scale feature of the first target tracking result based on the multi-scale template ROI feature and the ROI feature of the first target tracking result;

predicting a scale of a target in the search region based on the scale feature of the first target tracking result; and generating a second target tracking result by adjusting the first target tracking result based on a result of the predicting.

* * * * *